Feb. 14, 1967   SABURO FUKUI ET AL   3,304,246
METHOD OF ELECTROLYTICALLY DESCALING STEEL INCLUDING
SELECTIVE RECOVERY OF DISSOLVED SCALE PRODUCTS
Filed Dec. 16, 1964
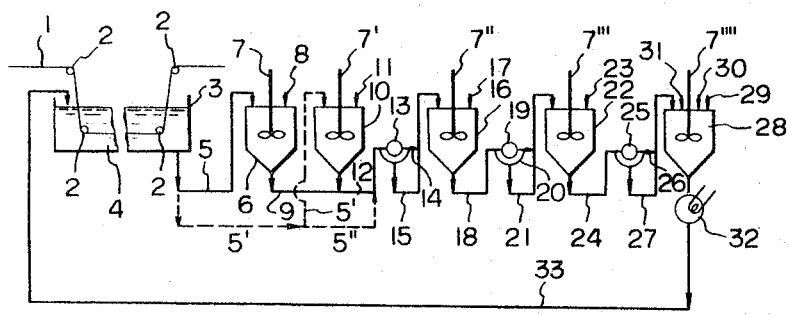
INVENTORS
SABURO FUKUI
MASATO YAMAMOTO
KOZO TAO
SHIGEO HASEGAWA
BY
Attorneys United States Patent Office 3,304,246
Patented Feb. 14, 1967

3,304,246
METHOD OF ELECTROLYTICALLY DESCALING STEEL INCLUDING SELECTIVE RECOVERY OF DISSOLVED SCALE PRODUCTS
Saburo Fukui, Hiroshima-shi, Masato Yamamoto, Asa-gun, and Kozo Tao and Shigeo Hasegawa, Hiroshima-shi, Japan, assignors to Mitsubishi Jukogyo Kabushiki Kaisha, Tokyo, Japan
Filed Dec. 16, 1964, Ser. No. 418,685
Claims priority, application Japan, Dec. 26, 1963, 38/69,775
7 Claims. (Cl. 204—145)

This invention generally relates to surface treatments of metals and is particularly directed to a novel and improved continuous electrolytic procedure for removing surface scale from ferrous material in an electrolytic bath and for recovering the metals which dissolve in the bath during the electrolytic process, thereby to regenerate the bath for further use as electrolyte.

The term "ferrous material" as used herein is deemed to refer to iron and steel in the form of webs, sheets, plates, wires, rods and the like, as they are obtained in iron and steel processing plants and is particularly directed to steel which contains alloying components such as nickel and/or chromium, to wit, nickel steel and nickel-chromium steel.

The usual manufacturing steps, such as rolling and annealing, to which ferrous material is subjected, result in the formation of scale oxides on the surfaces of the material. Various pickling and the like surface treating processes have been developed and suggested for the purpose of effectively removing these scale oxides (hereinafter referred to as "scales") from the metal surfaces. The most commonly employed scale removing processes involve electrolytic acid washing procedures in which the electrolyte essentially consists of strong inorganic acids such as sulfuric acid, nitric acid, hydrochloric acid, and the like. It is well known that in these prior art scale removing processes the effect of the treatment is largely dependent on the strength and concentration of the acid in the electrolyte and on the temperature at which the electrolysis is carried out. The stronger the acid and the higher the concentration of the acid in the electrolyte and the higher the temperature the better is the descaling effect. The use of strong acids at high concentrations causes, however, serious problems in respect to the apparatus in which the descaling treatment is to be carried out. Thus, only expensive acid resistant and anti-corrosive vessels and equipment can be employed. Moreover, the disposal of the waste liquors involves considerable problems due to their great acidity. In many locations discharge of acidic liquors into sewage systems and rivers is prohibited and, therefore, complicated recovery systems and/or neutralization of the waste liquor prior to discharge, such as by lime, are usually required.

The descaling of 18-8 type stainless steel and the like steels is particularly troublesome, because the scale formed by the rolling and heat treatments is the result of the oxidation of the uppermost stratum or surface of the steel body and the scale is therefore predominantly composed of iron oxides in admixtures with the oxides of chromium and nickel. The scale is extremely dense and the acids usually employed cannot properly dissolve and penetrate through the scale layer, the steel body itself being hardly soluble. Further, when the steel has a high content of chromium or when the scale is formed in a neutral or reducing atmosphere, it is extremely hard and hardly soluble. The descaling conditions vary greatly according to the conditions under which the scale has been formed. Thus, control of the electrolyte is very difficult.

While the use of such strong acids may result in effective removal of the surface scales, it will be realized that considerable amounts of the metal body proper may go into solution thus causing significant losses of material. If the dissolved metal is to be recovered, again complicated and expensive recovery systems are necessary. The dissolution of metal layers below the scale layers also detrimentally affects the surface characteristics such as gloss and lustre of the final metal and moreover, of course, causes rapid spending of the acid containing electrolyte. If nitric acid is used in the electrolyte, large amounts of poisonous nitrogen oxides are moreover evolved, the removal of which is difficult and complicated.

Accordingly, it is a primary object of this invention to provide for a method of electrolytically descaling ferrous material which is superior to prior art electrolytic descaling processes, which overcomes the disadvantages hereinabove referred to, which permits simple recovery of dissolved metals from the electrolytic bath and simple regeneration of the bath.

Another object of this invention is to provide a method of the indicated kind which is simple to carry out with relatively inexpensive materials and which results in descaled ferrous material of excellent surface characteristics.

Another object of this invention is to provide for a continuous process of electrolytically descaling nickel steel and nickel-chromium steel, wherein dissolved iron, nickel and chromium are readily recovered from the electrolyte and the electrolyte is regenerated, and wherein the regenerated electrolyte can be immediately reused for further electrolysis.

Still another object of this invention is to provide a method of the indicated kind wherein the electrolyte is easily regenerated.

Briefly, the inventive process for recovering dissolved metal from the electrolyte and for regenerating the electrolyte is applicable to the electrolytic descaling of ferrous material in which the electrolysis proper is carried out with an electrolyte which essentially consists of an aqueous solution containing at least 2 percent by weight of the sodium or potassium salts of sulfuric acid or nitric acid and not more than 10 percent, preferably 0.1 to 10 percent, of an organic substance which is capable of forming complex ions with the metal ions emanating from the ferrous material.

The aqueous solution may contain at least 2 percent by weight of two or more of said sodium or potassium salts.

The organic substances referred to are, for example, tartaric acid or citric acid and their salts, particularly their potassium and sodium salts. However, any substance which will form complex ions with the dissolved metal ions, to wit, iron, nickel and/or chromium, in a similar way as does tartaric acid or citric acid and their salts, can be employed.

The electrolyte should also preferably contain about 0.1 to 10 percent by weight of a water soluble fluoride such as, for example, NaF, KF, $KHF_2$, $NH_4F$ and $SnF_2$.

The electrolytic descaling with the electrolyte referred to above may be carried out in any suitable manner, for example, by immersing the ferrous material, such as nickel steel or nickel-chromium steel in the electrolyte and by passing the electric current directly through the material with the material being arranged as the anode in the circuit. Generally, the ferrous material may be one of the electrodes in the electric circuit or the electric circuit may be passed indirectly through the material, the material itself being polarized.

The electrolyte has a substantially neutral or slightly acidic pH value.

In accordance with the invention, and at the end of the descaling of a predetermined quantity of ferrous material, the pH of the electrolyte is adjusted to a value of about 3 to 5. If the pH is in the neutral range at this time, this may be effected by adding an amount of an acid such as, for example, sulfuric acid, nitric acid or hydrofluoric acid to lower the pH value of the electrolyte to the indicated value of 3 to 5. In this manner, iron which has been dissolved out during the electrolysis precipitates in the form of iron hydroxide. This iron hydroxide is then separated, for example, by filtration and is thus recovered. The pH of the residue of this solution, i.e. the filtrate obtained after filtration of the iron hydroxide, is thereafter raised again to a value of about 5 to 6. This is accomplished by adding to the solution a suitable alkaline substance such as, for example, sodium hydroxide, potassium hydroxide or mixed alkali metal hydroxides. The raising of the pH value to the indicated value causes the formation of a chromium hydroxide precipitate in the event that chromium ions are present in the solution. The chromium hydroxide is then separated, for example, by filtration and any chromium contained in the solution is thus recovered in this manner. The residue thus obtained is then admixed with additional amounts of alkali metal hydroxides to raise the pH value to a value above 6, e.g. 6 to 8, to cause the formation of nickel hydroxide which again is separated, for example, by filtration. In this manner, a solution is obtained which is freed from iron, nickel and chromium and this solution constitutes the regenerated electrolyte which, after suitable processing, is recycled for reuse in the electrolytic process.

It will be realized from the above that, contrary to the prior art electrolytic descaling processes which employ the conventional strong inorganic acids as the main ingredient of the electrolyte, the electrolyte for use in the inventive process essentially makes use of neutral salts such as, for example, $Na_2SO_4$ and $NaF$ as well as organic acids such as tartaric acid or citric acid or their salts. This means that the electrolytic bath or solution proper is inherently neutral or weakly acidic in nature.

During electrolysis, with the ferrous material being arranged as one of the electrodes, it may be presumed that free acids such as sulfuric acid or hydrofluoric acid are formed in the vicinity of the electrode and these free acids cause very effective descaling of the surfaces of the material. Due to the presence of the organic substance such as tartaric acid or citric acid, the metals which are dissolved from the ferrous material, that is, for example, iron and nickel, form complex ions with the organic material and remain in solution without precipitating. Only if the amount of dissolved metal exceeds the equivalent amount of complex forming organic substance in the bath, such as tartaric acid or citric acid, does precipitation take place. However, in view of the nature of the electrolytic bath, the metal body proper is not, or only insignificantly, attacked by the electrolyte so that the amount of metal ions going into solution and emanating from the metallic body proper is insignificant. Since relatively large amounts of organic substance, such as tartaric acid or citric acid, are contained in the electrolyte, this amount is sufficient to bind the metallic ions in complex form. Experience has demonstrated that electrolysis with the inventive electrolyte yields metal surfaces of great gloss and lustre.

In respect to the salts mentioned above, $Na_2SO_4$, $K_2SO_4$, $NaNO_3$ and $KNO_3$ are suitable for use in the electrolyte.

As previously mentioned, various water soluble fluorides may be used, such as for example $NaF$, $NH_4F$, $KF$, $KHF_2$ and $SnF_2$.

In addition to tartaric acid and citric acid, their sodium or potassium salts are particularly suitable complex forming organic substances.

Although applicants do not wish to be limited by any theories advanced by them, it is believed that the following theoretical considerations apply to the inventive process. If, for example, an 18–8 type stainless steel is electrolyzed in an electrolyte which essentially consists of an aqueous solution of $Na_2SO_4$, $NaF$ and tartaric acid, the metals which are dissolved during the electrolytic process are mainly Fe, Ni and Cr. These metals remain in solution in the form of trivalent ions, respectively. If the electrolyte would not contain tartaric acid, that is, would only comprise neutral salts such as $Na_2SO_4$, the $Fe^{+++}$ and $Ni^{+++}$ ions can be precipitated in the form of their hydroxides by increasing the pH value of the electrolyte, that is, by increasing the $OH^-$ concentration in the solution according to the Equation 1 below, while the chromium ions have been oxidized to chromate ions, that is, they are oxidized to the hexavalent state and hence the chromium ions do not precipitate in the alkaline liquid.

(1) $Fe^{+++} + Ni^{+++} + 6(OH)^- \rightarrow Fe(OH)_3 + Ni(OH)_3$

However, in accordance with the inventive process, the electrolyte contains as an additive an amount of complex-ion-forming substance, such as tartaric acid. This means that the $Fe^{+++}$ and $Ni^{+++}$ ions form complex ions with the tartaric acid according to Equation 2 below and therefore do not precipitate in the form of the hydroxide, even if the electrolyte has an alkaline pH value. These ions, however, remain only in the solution as long as the quantities of Fe and Ni ions present in the solution do not exceed the equivalent quantity of the complex-ion-forming substance, to wit, tartaric acid in the solution.

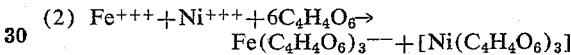

(2) $Fe^{+++} + Ni^{+++} + 6C_4H_4O_6 \rightarrow Fe(C_4H_4O_6)_3^{---} + [Ni(C_4H_4O_6)_3]$ This means that as long as the quantities of the ions of the dissolved metals do not exceed the equivalent quantities of the tartrate ions, the reaction according to Equation 1 does not take place. If such quantities are exceeded, however, the hydroxides can be precipitated according to the reaction of Equation 1. Further, the oxidation of the Cr ion to the hexavalent state is suppressed due to the presence of the complex-ion-forming substance in the solution and for this reason, the chromium ions are retained in the solution in trivalent state in amounts proportional to the amount of complex-ion-forming agent. Therefore, if the pH of the electrolyte is properly adjusted, chromium hydroxide, that is, the trivalent form, can be precipitated according to the following Equation 3.

(3) $Cr^{+++} + 3(OH)^- \rightarrow Cr(OH)_3$

Experiments have been carried out with 18–8 type stainless steel for the purpose of ascertaining the relationship between the additive amount of tartaric acid and the rate of recovery of chromium. The results of these tests are tabulated in Table I.

*Table I*

| Additive amount of $C_4H_4O_6$ (percent): | Rate of recovery of Cr as hydroxide (percent) |
|---|---|
| 0.1 | 18 |
| 0.25 | 30 |
| 0.50 | 49 |
| 1.00 | 100 |

Concerning the relationship between the metals which are in solution in the electrolyte and the pH of the electrolyte at which the precipitation of the metals in the form of hydroxides takes place, it was found that the Fe ion can be almost completely precipitated in the form of its hydroxide at a pH of about 3 to 5 while the chromium ion is completely precipitated at a pH of about 5 to 6. The Ni ion by contrast, precipitates at a pH of 6 to 7 or 6 to 8.

The amount of neutral salts such as $Na_2SO_4$, the water soluble fluoride such as $NaF$ and the amount of complex-ion-forming substance such as tartaric acid or citric acid to be dissolved in the electrolyte forming solution, are dependent on various factors such as economics, the electrolytic effect to be obtained and the rate of recovery of the dissolved metals. Generally speaking, however, it is preferred that the neutral salts are present in amounts of at least 2 percent, preferably 2 to 10 percent. The water soluble fluoride may be present in an amount of 0.1 to 10 percent while the complex-ion-forming substance may be present in amounts of 0.25 to 10 percent.

As previously stated, the electrolyte used in the inventive process is almost neutral, generally having a pH of between 6 to 7. This means that the predominant portion of the Fe, Cr and Ni ions in the solution is completely subjected to the reactions of the above Equations 1 and 3. Therefore, these metals are converted into their hydroxide form and are precipitated usually in the form of a mixture in the electrolyte. With a view to separating and recovering the iron hydroxide from such a mixture of precipitates, it is suggested first to add an amount of inorganic acid such as sulfuric acid to the electrolyte to lower the pH of the solution to 3 to 5 so that the nickel hydroxide and the chromium hydroxide portions of the precipitate are again ionized. To recover the chromium hydroxide, it is only required to add a suitable amount of alkali metal hydroxides such as, for example, sodium or potassium hydroxide so that the filtrate which has been obtained after the filtration of the iron oxide is adjusted to the indicated pH value of 5 to 6 whereupon the chromium hydroxide thus formed is then moved by filtration. The resulting filtrate is then enriched with a suitable amount of alkali metal hydroxide to raise the pH value of the liquid to about 6 to 7 or 8 whereupon the nickel hydroxide thus formed is separated by filtration.

It will be realized that the composition of the electrolyte from which the dissolved metals have been removed and recovered is substantially the same as of the original electrolyte. Therefore, the electrolyte after removal of the metals in the indicated manner may be recycled for reuse in the electrolytic process provided the pH of the electrolyte is properly adjusted. In addition, an amount of water should be added to the regenerated electrolyte, this amount of water corresponding to the water which has been consumed by the aforesaid reactions. In other words, the amount of water to be added is the same which has been required to deposit the metal oxides of the main components of the scale in the form of their hydroxides. Further, the amount of the solutes which adheres to the stainless steel body and which is thus removed from the system together with the steel should be compensated for by adding fresh amounts of such solutes.

The concentration of the solutes in the electrolyte is, of course, a factor in successfully and rapidly carrying out the electrolysis. Tests have established that a concentration of less than 2 percent of the potassium or sodium salts of sulfuric acid or nitric acid is not ordinarily sufficient to effect rapid descaling. The descaling proceeds more rapidly if the potassium or sodium salts of sulfuric or nitric acid are present in amounts between 2 to 10 percent. In a preferred embodiment, however, 10 to 20 percent by weight of these salts should be dissolved in the electrolyte.

The water soluble fluoride may be used at a concentration of 0.1 to 10 percent, to reduce the loss of ferrous material. The presence of the fluoride expedites the electrolysis and reduces the amount of metal which may dissolve from the metallic body proper. From a practical and economical point of view, concentrations of 0.5 to 1 percent by weight of water soluble fluoride are preferred.

The organic substance such as tartaric acid or citric acid may be present in amounts up to 10 percent. However, excellent results are obtained with amounts of up to 5 percent.

The potassium or sodium salts of sulfuric and nitric acid may be dissolved as such in the electrolyte or they may be formed in situ by adding suitable amounts of sulfuric and/or nitric acid and potassium or sodium hydroxide. The same applies to the water soluble fluorides, in which event HF may be added to the electrolyte provided equivalent amounts of metal ions are present in the solution. Generally, the acid and base should be added to the electrolyte in such stoichiometric quantities that the desired amount of salt is formed in the solution.

The effect of the present invention is also the same if the electrolysis is carried out in an electrolyte consisting of an aqueous solution of the aforesaid neutral salts, to which an amount of sulfuric acid, nitric acid or hydrofluoric acid or their mixed acids or of sodium hydroxide, potassium hydroxide or their mixed alkalis is added, so as to adjust the pH to a suitable value. In the case of a pH of 3 to 6, the dissolution loss is decreased and the degree of gloss is increased as the pH is increased. Further, the descaling rate becomes higher in spite of the decrease in the dissolution loss. If the pH is 6 or higher, the dissolution loss is increased and the rate of the descaling is increased proportionally to the loss as the pH is increased. The gloss of the finished surface obtained in this range of pH is particularly excellent. In case the pH of the electrolyte is 3 or lower, however, the dissolution loss is considerably increased and the finished surface is roughened. Thus, pH values of 3 or lower are to be avoided.

In carrying out the electrolysis, the ferrous material may be arranged as the anode or as one of the electrodes and direct or alternating electric current may be passed directly therethrough, or otherwise a so-called indirect current-passing method may be employed in which both the anode and the cathode are arranged in the electrolyte and the electric current is passed between them, thereby indirectly polarizing the ferrous material.

An embodiment for carrying out the method of the present invention is illustrated in connection with the drawing whose single figure shows diagrammatically an embodiment for carrying out continuously the electrolysis and the recovery of the dissolved metals according to the process of the present invention.

A strip of 18–8 type stainless steel 1 to be descaled is fed into an electrolytic descaling tank 3 by means of and over guide rolls 2. The electrolytic tank 3 holds electrolyte 4 which consists of 20 percent by weight of $Na_2SO_4$, 1 percent by weight of NaF and 1 percent by weight of tartaric acid dissolved in water. The tank is so designed that the steel 1, passing through the electrolyte, is indirectly supplied with electric current from a source of direct current (not shown). The time during which the steel is subjected to electrolysis in the electrolytic tank varies depending on the nature of the scale, the concentration of the electrolyte, the temperature and the pH value of the electrolyte, as well as on the density of the electric current. When cold-rolled 18–8 type stainless steel is electrolyzed by the electrolyte of the above-mentioned composition at a temperature of 80° C., a pH of 3 and an electric current density of 5 A./dm.$^2$, complete descaling can be achieved in about 75 seconds with a small dissolution loss (0.40 mg./cm.$^2$). A very glossy finished surface can be obtained in that manner.

After the steel strip 1 has been completely descaled in the electrolytic tank 3 as stated above, it is then subjected to subsequent processing steps.

As the result of the electrolysis, the metal ions, dissolved out from the surface of the steel, are present in the electrolyte 4 either in solution or are contained therein in the form of a flocculent precipitate, depending on the pH of the electrolyte. The electrolyte 4 containing the metal ions is then transferred into a precipitate-dissolving tank 6 or an iron hydroxide-depositing tank 10 or a separator 13, respectively, depending on the pH of the electrolyte. In other words, if the pH of the electrolyte is 6 or above, the hydroxides of iron, chromium and nickel are present therein in the form of a precipitate consisting of a mixture of these three hydroxides. In order first to recover iron hydroxide from the precipitate, the electrolyte 4 is introduced into the precipitate-dissolving tank 6 through a conduit 5. The liquid is properly agitated by a stirrer 7 and admixed with an amount of nitric acid 8 to adjust the pH of the liquid to 3–5, thereby to dissolve the chromium hydroxide and nickel hydroxide present in said precipitate. The liquid is then transferred through conduits 9 and 12 into the separator 13 where the solid mass of iron hydroxide precipitate 14 is separated.

If the pH of the electrolyte 4 is 3 or below after concluded electrolysis, the electrolyte does not contain any substantial precipitate and is therefore transferred into the iron hydroxide depositing tank 10 through a conduit 5. In this depositing tank 10, the electrolyte is admixed with an amount of sodium hydroxide 11 to adjust the pH to 3–5, thereby to form iron hydroxide precipitate. The solid mass or iron hydroxide is thereafter recovered similarly to the above-mentioned manner.

If, by contrast, the pH of the electrolyte 4, after electrolysis, is 3 to 6, the precipitate mainly consists of iron hydroxide and the electrolyte is thus directly transferred into the separator 13 in which the recovery of iron hydroxide is effected, without necessitating the aforesaid adjustment of the pH of the electrolyte.

The filtrate which has been separated in the separator 13 is then fed through a conduit 15 into the chromium hydroxide depositing tank 16. As will be clear from the above, the filtrate which is separated from the iron hydroxide has a pH in a range of 3 to 5 and is admixed with an amount of sodium hydroxide 17 in the depositing tank 16 to adjust the pH to 5 to 6 and to deposit the chromium hydroxide which has remained in solution. The solution is subsequently conveyed into the separator 20 and filtered to recover the chromium hydroxide 20. The filtrate from the separator 20 is transferred through a conduit 21 into the nickel hydroxide depositing tank 16. There the pH of the filtrate is adjusted to 6 to 8 by addition of sodium hydroxide so as to deposit the nickel hydroxide which is then separated by a separator 26 and recovered.

The filtrate remaining after the recovery of the nickel hydroxide is then fed through a conduit 27 into an electrolyte preparing tank 28 where the filtrate is admixed with an amount of sulfuric acid 29 or sodium hydroxide 30 to make up for the desired concentration of the solutes and to adjust the desired pH value, whereafter the filtrate electrolyte is recycled to the electrolysis tank 3 through a temperature-adjusting device 32 and a conduit 33. The described recovery method makes it possible to recover more than 95% of the dissolved-out metals.

In accordance with the inventive process, it is possible not only to obtain a decrease in the dissolution loss of the metal body proper, a reduction in the electrolysis time and an improved finish, as compared with the hitherto known electrolytic pickling processes, but the process also enables continuous regeneration of the spent acid-washing liquor and fractional recovery of the dissolved-out metals. Thus, the process results in many advantages, such as saving in acid-resistant equipment, decrease in the consumption of the electrodes, simpler water-rinsing of the acid-washed material, and no disposal problem for waste liquor.

Reference is also had to the copending application of the inventors Fukui and Yamamoto, Serial No. 413,644, filed on or about November 24, 1964, for Chemical Electrolyte and Electrolytic Methods.

While a specific embodiment of the invention has been shown and described in detail to illustrate the application of the inventive principles, it will be understood that the invention may be embodied otherwise without departing from such principles.

What is claimed is:

1. In a method of electrolytically descaling nickel and chromium containing steel, wherein the electrolysis is carried out in an electrolytic bath of an aqueous solution consisting essentially of (1) at least about 2 percent by weight of at least one salt selected from the group consisting of the sodium and potassium salts of sulfuric acid and nitric acid; and (2) not more than about 10 percent by weight of an organic substance capable of forming complex ions with iron, chromium and nickel, the step of recovering iron, nickel and chromium dissolved in the electrolyte during the electrolysis by first precipitating the iron in the form of its hydroxide at a pH of about 3 to 5 and removing the iron hydroxide from the bath, then precipitating the chromium in the form of its hydroxide at a pH of about 5 to 6 and removing the chromium hydroxide from the bath, and thereafter precipitating the nickel in the form of its hydroxide at a pH of about 6 to 8 and removing the nickel hydroxide from the bath.

2. In a method as claimed in claim 1, wherein said organic substance is selected from the group consisting of tartaric acid, citric acid and their potassium and sodium salts.

3. In a method as claimed in claim 1, wherein the bath, after removal of said hydroxides, is recycled for use as electrolyte in the electrolytic descaling method.

4. In a method as claimed in claim 1, wherein the pH of the original bath is substantially neutral.

5. In a method as claimed in claim 1, wherein the adjustment of the pH values to precipitate the respective hydroxides is effected by adding respective amounts of a member selected from the group consisting of sulfuric acid, nitric acid, hydrofluoric acid and alkali metal hydroxides.

6. In a continuous method of electrolytically descaling nickel- and chromium-containing steel, wherein the electrolysis is carried out in an electrolytic bath of an aqueous solution consisting essentially of (1) about between 2 to 20 percent by weight of at least one salt selected from the group consisting of the sodium and potassium salts of sulfuric acid and nitric acid;

(2) about between 0.5 to 1 percent by weight of a soluble fluoride selected from the group consisting of $NaF$, $KF$, $KHF_2$, $NH_4F$ and $SnF_2$, and (3) about between 0.25 to 10 percent by weight of a member selected from the group consisting of tartaric acid, citric acid and their sodium and potassium salts, having a substantially neutral pH, whereby iron hydroxide, nickel hydroxide and chromium hydroxide in the form of a mixed precipitate are formed, the improvement which comprises recovering said hydroxides, by acidifying the precipitate to a pH value of about 3 to 5, whereby said iron hydroxide remains precipitated while said chromium hydroxide and said nickel hydroxide dissolve, removing the iron hydroxide, then raising the pH to about 5 to 6 by adding alkali metal hydroxide to precipitate said chromium hydroxide, removing said chromium hydroxide, further raising the pH to more than 6 by adding alkali metal hydroxide to precipitate the nickel hydroxide, removing the nickel hydroxide, and recycling the regenerated electrolytic bath thus obtained to electrolyze further quantities of steel.

7. The method of claim 1 wherein said solution includes from about 0.1 to 10 percent by weight of a water soluble fluoride.

References Cited by the Examiner

UNITED STATES PATENTS

| | | | |
|---|---|---|---|
| 1,863,868 | 6/1932 | McCullough | 204—146 |
| 2,371,529 | 3/1945 | Loose | 204—146 |
| 2,915,444 | 12/1959 | Meyer | 204—145 |
| 3,043,758 | 7/1962 | Machu | 204—145 |

FOREIGN PATENTS 112,341    6/1900    Germany.

JOHN H. MACK, *Primary Examiner.*

R. K. MIHALEK, *Assistant Examiner.*